Aug. 19, 1952 — H. E. PRICE — 2,607,287
ELECTRIC GRILL
Filed Sept. 10, 1949 — 2 SHEETS—SHEET 1
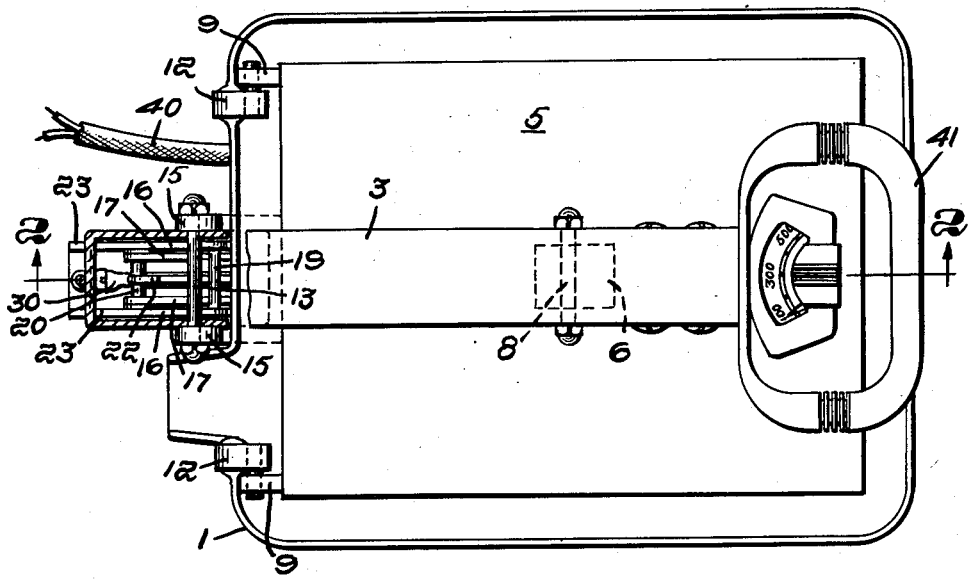
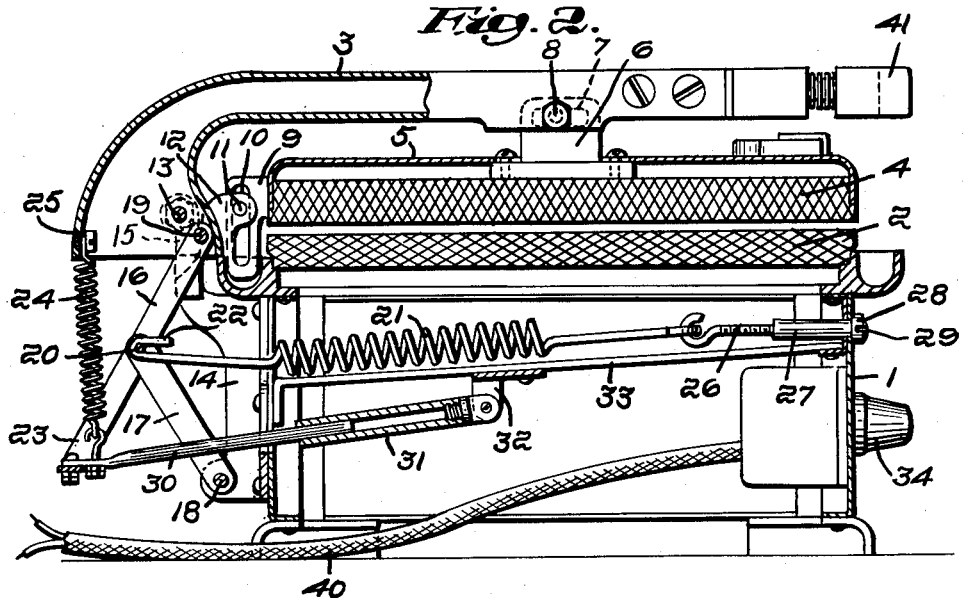
Inventor:
Harry E. Price,
by Heard, Smith & Tennant
Attorney

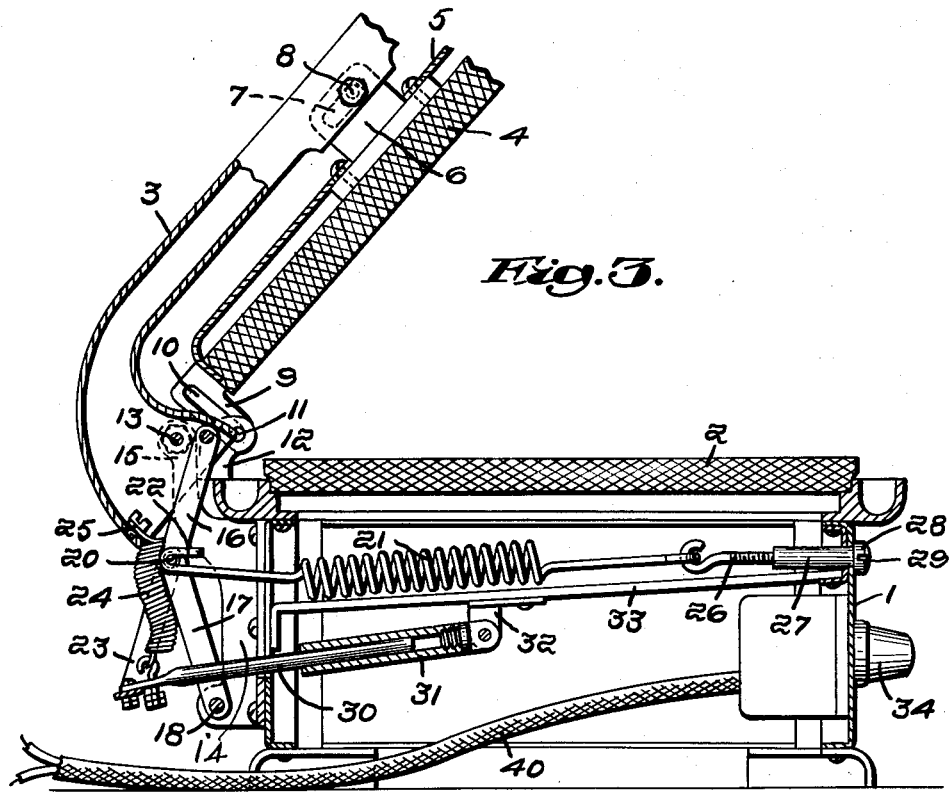
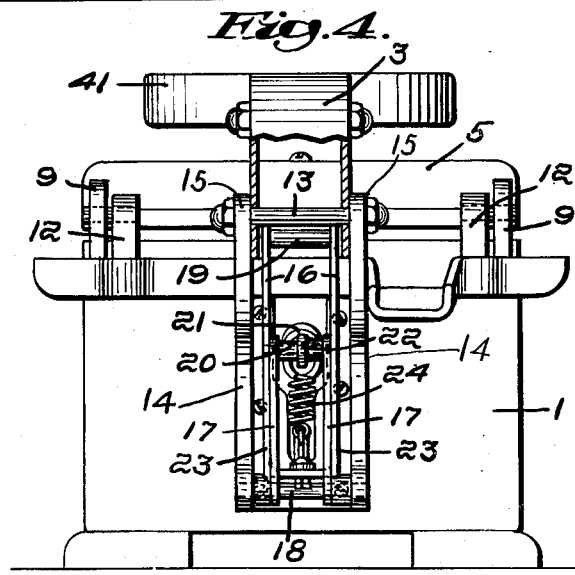
Fig. 3.
Fig. 4.
Inventor:
Harry E. Price,
by Heard Smith & Tennant
Attorneys Patented Aug. 19, 1952

2,607,287

UNITED STATES PATENT OFFICE 2,607,287

ELECTRIC GRILL

Harry E. Price, Brookline, Mass.

Application September 10, 1949, Serial No. 114,953

1 Claim. (Cl. 99—372)

This invention relates to electric grills of the type comprising a frame supporting a bottom hot plate and an arm pivotally mounted on the frame and carrying a top hot plate which can be moved toward and from the bottom hot plate by a swinging movement of the arm.

Electric grills of this type are used quite extensively for making toasted sandwiches and one of the objects of the invention is to provide an electric grill of the above type with novel spring means for so counterbalancing the weight of the arm and top hot plate that when the hot plate is in operative position, it will engage but rest very lightly on the top surface of the sandwich thereby avoiding the danger that the sandwich will be unduly crushed by the weight of the arm and top hot plate.

Another object of the invention is to provide improved counterbalancing means for the pivoted arm which not only functions as above described, but which is so constructed that when the arm is in its open or raised position, said spring means will overbalance the weight of the arm and the top hot plate and thereby yieldingly hold them in such open position.

Other objects of the invention are to improve generally electric grills of this type in the particulars hereinafter set forth.

In the drawings,

Fig. 1 is a top plan view of an electric grill embodying my invention with part of the arm broken out.

Fig. 2 is a section on the line 2—2, Fig. 1, showing the arm and top hot plate in closed operative position.

Fig. 3 is a similar sectional view showing the arm and top hot plate in raised or open position.

Fig. 4 is an end view of the electric grill looking from the left in Fig. 1 and with part of the arm broken out.

The electric grill herein shown is of that known type which comprises a supporting frame 1 on which is stationarily mounted the bottom hot plate 2, and which also comprises an arm 3 that is pivotally mounted to the frame at 13 and which supports the top hot plate 4 so that by swinging the arm about its pivot, the top hot plate 4 may be moved from its operative position shown in Fig. 2 to the open position shown in Fig. 3.

The top hot plate 4 may be connected to the arm 3 in any usual way and as herein shown said top hot plate 4 is carried in a housing member 5 which has a lug 6 extending from its upper side that enters a recess formed in the underside of the arm 3, said lug being provided with the slot 7 through which passes a supporting bolt 8 that is carried by the arm. This provides not only a pivotal connection between the top hot plate and the arm, but also permits a certain movement of the top hot plate longitudinally of the arm. The rear of the housing 5 carries two brackets 9, each having a vertical slot 10 which receives a guiding pin 11 carried by a lug 12 rigid with the frame 1. This slotted bracket and pin serve as a means of maintaining the top hot plate in position during the swinging movement of the arm. The parts thus far described are such as are usually found in grills of this type and form no part of my invention, which as stated above, relates to the means for counterbalancing the weight of the arm 3 and the top hot plate 4.

Mounted on the rear end of the frame 1 is a supporting bracket 14 having at its upper end two upstanding arms 15 which support the pivotal connection 13 for the arm 3, the latter being in the form of a pivotal pin which extends through the arms 15 and through the pivoted arm 3.

The counterbalancing means above referred to includes a toggle lever device comprising an upper toggle member 16 and a lower toggle member 17 pivotally connected together at 20, the lower end of the lower toggle member 17 being pivotally connected at 18 to the lower end of the bracket 14, and the upper end of the upper toggle member 16 being pivotally connected at 19 to the arm 3 closely adjacent to the pivotal connection 13 for the arm. The pivotal connection 19 is located in front of the pivot 13 for the arm.

Said counterbalancing means also includes a pulling spring 21 which is connected at one end to the pivotal connection 20 of the toggle lever as shown at 22 and which is anchored at the other end to the front of the frame 1, said spring exerting a pulling force toward the right, Fig. 2, on the center pivot 20 of the toggle device which tends to straighten the toggle.

The upper toggle member 16 is provided with an extension 23 to the lower end of which is secured a second pulling spring element 24, the upper end of said spring 24 being secured to the arm 3 at 25 in the rear of its pivot 13.

The toggle level device 16, 17 is in its broken condition shown in Fig. 2 when the arm 3 is in its lowered operative position and at this time the spring 24 is under some tension and is exerting a downward pulling force on the arm at the rear of its pivot.

The tension of the spring 21 tends to urge the central pivot 20 of the toggle lever device toward the right and thus tends to straighten said toggle. The straightening of the toggle device exerts an upward force on the pivot 19 which, because said pivot is at the front of the pivot 13 for the arm, will tend to raise the arm. As stated above, when the arm 3 and the top hot plate are in their lowered operative positions shown in Fig. 2 the spring 24 exerts a downward pulling force on the arm at the rear of its pivot 13, and the combined upward thrust of the toggle device on the pivot 19 and the downward pulling force exerted by the spring 24 very nearly but not quite counterbalances the weight of the arm 3 and the top hot plate 4 so that when said arm and top hot plate are in their closed and operative position shown in Fig. 2, the top hot plate will rest very lightly upon any sandwich or other article which is located on the bottom hot plate.

With the arm 3 and top hot plate 4 thus counterbalanced they will not apply any crushing pressure on a sandwich or other article of food which is being toasted or cooked between the two hot plates.

When the arm 3 and top hot plate are swung upwardly into their open positions, the toggle lever device 16, 17 moves toward a straightened position shown in Fig. 3, and thus the pulling action of the spring 21 will exert an increased lifting force on the pivot 19 due to the straightening of the toggle thereby applying to the arm an increased counterbalancing force. By the time the arm 3 has been swung into its completely open position shown in Fig. 3, this counterbalancing force of the spring 21 is sufficient to overbalance the weight of the arm and thus yieldingly hold said arm and top hot plate in their elevated position. The spring 24 operates as a counter-balancing factor only when the arm 3 is in its lowered operative position, and during the initial opening movement of said arm said spring closes up and by the time that the arm is fully raised, as shown in Fig. 3, said spring is in a very loose condition.

When the arm 3 is swung downwardly from its open to its closed position, the overbalancing action of the spring 21 will be lost and as said arm moves into its closed or operative position shown in Fig. 2, the spring 24 again becomes operative to apply a counter-balancing force to the arm. Such counter-balancing force of the spring 24 together with that exerted by the spring 21 will nearly but not quite counterbalance the weight of said arm and top hot plate.

Means are provided for adjusting the tension of the spring 21 to meet the above conditions, and for this purpose the front end of the spring is shown as connected to a screw hook 26 which has screw threaded engagement with a sleeve 27 that extends through the front of the frame 1, said sleeve being provided with a head 28 having a screw driver slot 29, so that by turning the sleeve the screw 26 may be advanced or retarded to increase or decrease the tension of the spring 21.

In order to steady the movement of the arm 3 and top hot plate 4 from its open to its closed position, I propose to employ a dash pot device herein illustrated as a plunger 30 secured at one end to the extension 23 of the upper toggle member 16 and having its other end operating in a cylinder 31 which is anchored at its forward end to a bracket 32 carried by a support 33 that extends longitudinally of the frame. The fit between the plunger 30 and the cylinder 31 is such as to allow the plunger to freely move in the cylinder, but will prevent any sudden or rapid movement thereof.

The apparatus is provided with the usual control switch 34 by which the heating current can be turned on or off from the hot plates 2 and 4. The circuit wiring connections between the switch and the hot plates are not shown herein as they form no part of the present invention and will be such as are usually employed in devices of this type, the lead-in electric cord being indicated at 40.

The arm 3 is provided at its free end with an insulated handle portion 41 for manipulating it.

I claim:

An electric grill comprising a supporting frame, a bottom hot plate mounted threon, an arm pivotally mounted on the frame at the rear end thereof, an upper hot plate carried by said arm, a toggle lever device at the rear end of the frame and comprising an upper toggle member and a lower toggle member located one above the other and pivotally connected together, means pivotally connecting the lower end of the lower toggle member to the frame at a fixed point in the rear thereof, means pivotally connecting the upper toggle member to the arm adjacent its pivotal axis but in front thereof, said toggle lever device being in a broken condition when the arm and top hot plate are in their lowered closed positions, a pulling spring acting on said toggle lever member and tending to move it from its broken condition toward its straightened condition, a second pulling spring secured to said arm in the rear of its pivotal axis and operative when the arm is in its lowered operative position to exert a downward pulling force on said arm in the rear of its pivot, said springs cooperating to nearly but not quite counter-balance the combined weight of the arm and the top hot plate when they are in their lowered operative positions, said second pulling spring becoming inoperative as a counter-balancing feature during the upward swinging movement of the arm and the first-named pulling spring acting through the straightening movement of the toggle lever device to exert an increasing upward thrust against said arm as it swings into open position, which upward thrust is sufficient to yieldingly hold said arm in such open position.

HARRY E. PRICE.

REFERENCES CITED

The following references are of record in the file of this patent:

UNITED STATES PATENTS

| Number | Name | Date |
| --- | --- | --- |
| 1,656,662 | Carter et al. | Jan. 17, 1928 |
| 1,706,612 | Jaeger | Mar. 26, 1929 |
| 1,978,872 | Wharton | Oct. 30, 1934 |
| 2,033,060 | Anderson | Mar. 3, 1936 |
| 2,033,067 | Fromknecht | Mar. 3, 1936 |
| 2,039,218 | Govoroff | Apr. 28, 1936 |